(12) United States Patent
Kliesch et al.

(10) Patent No.: US 7,229,696 B2
(45) Date of Patent: *Jun. 12, 2007

(54) MULTILAYER, TRANSPARENT FILM MADE FROM PET AND PEN WITH AT LEAST ONE FUNCTIONAL OUTER LAYER FOR PRODUCING COMPOSITE PACKAGING WITH UV RESISTANCE

(75) Inventors: Holger Kliesch, Mainz (DE); Ursula Murschall, Nierstein (DE); Franz Hora, Kriftel (DE); Guenther Crass, Taunusstein (DE); Herbert Peiffer, Mainz (DE); Bodo Kuhmann, Runkel (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/462,511

(22) Filed: Jun. 16, 2003

(65) Prior Publication Data

US 2003/0235703 A1 Dec. 25, 2003

(30) Foreign Application Priority Data

Jun. 20, 2002 (DE) .............................. 102 27 440

(51) Int. Cl.
B32B 27/08 (2006.01)
B32B 27/20 (2006.01)
B32B 27/32 (2006.01)
B32B 27/34 (2006.01)
B32B 27/36 (2006.01)

(52) U.S. Cl. ................ 428/475.2; 428/212; 428/495.2; 428/480; 428/483; 428/910; 528/302; 528/305; 528/308; 528/308.6; 264/288.4; 264/290.2

(58) Field of Classification Search .................... None
See application file for complete search history.

(56) References Cited

U.S. PATENT DOCUMENTS

| | | | | |
|---|---|---|---|---|
| 4,604,257 A * | 8/1986 | Smith et al. | ................ | 264/513 |
| 4,883,706 A * | 11/1989 | Grosjean | ................... | 428/215 |
| 5,073,435 A * | 12/1991 | Eyraud et al. | ............. | 428/215 |
| 5,164,248 A * | 11/1992 | Fleury et al. | ................ | 428/220 |
| 5,215,825 A * | 6/1993 | Hiraoka et al. | ............ | 428/480 |
| 5,292,471 A * | 3/1994 | Ito et al. | ................ | 264/173.16 |
| 5,552,512 A * | 9/1996 | Sublett | ........................ | 528/308 |
| 5,912,307 A * | 6/1999 | Paschke et al. | ............. | 525/444 |
| 5,948,525 A * | 9/1999 | Kimura et al. | .............. | 428/339 |
| 5,955,181 A * | 9/1999 | Peiffer et al. | ................ | 428/212 |
| 5,972,445 A * | 10/1999 | Kimura et al. | ............. | 428/35.4 |
| 6,054,212 A * | 4/2000 | Peiffer et al. | ................ | 428/336 |
| 6,149,995 A * | 11/2000 | Peiffer et al. | ............... | 428/35.8 |
| 6,291,053 B1 * | 9/2001 | Peiffer et al. | ................ | 428/141 |
| 6,383,585 B2 * | 5/2002 | Peiffer et al. | .............. | 428/35.9 |
| 6,503,549 B1 * | 1/2003 | Mueller | ....................... | 426/396 |
| 6,534,169 B2 * | 3/2003 | Pfeiffer et al. | .............. | 428/336 |
| 6,537,647 B2 * | 3/2003 | Peiffer et al. | ................ | 428/141 |
| 6,852,388 B2 * | 2/2005 | Murschall et al. | ........... | 428/141 |
| 6,946,192 B2 * | 9/2005 | Peiffer et al. | ................ | 428/339 |
| 2001/0009722 A1 | 7/2001 | Scott et al. | .................. | 428/480 |
| 2001/0044009 A1* | 11/2001 | Peiffer et al. | ................ | 428/141 |
| 2002/0015835 A1* | 2/2002 | Peiffer et al. | ................ | 428/216 |
| 2002/0037418 A1* | 3/2002 | Peiffer et al. | ................ | 428/458 |
| 2002/0039646 A1* | 4/2002 | Peiffer et al. | ................ | 428/216 |
| 2003/0235701 A1* | 12/2003 | Kliesch et al. | .............. | 428/480 |
| 2003/0235702 A1* | 12/2003 | Kliesch et al. | .............. | 428/480 |

FOREIGN PATENT DOCUMENTS

| | | |
|---|---|---|
| DE | 1 567 189 A1 | 5/1980 |
| DE | 2 123 340 A1 | 2/1984 |
| DE | 197 20 505 A1 | 11/1998 |
| EP | 0 839 854 A1 | 5/1977 |
| EP | 0 849 075 A2 | 6/1998 |
| EP | 0 903 222 A2 * | 3/1999 |
| EP | 1 179 418 A2 | 2/2002 |
| GB | 1 444 163 A | 7/1976 |
| GB | 2 228 940 * | 9/1990 |
| GB | 2 344 596 A | 6/2000 |
| JP | 11 227840 A1 | 8/1999 |
| WO | WO 95/17303 A1 | 6/1995 |
| WO | WO 96/35571 A1 | 11/1996 |
| WO | WO 93/23723 A1 | 9/1997 |
| WO | WO 93/23724 A1 | 9/1997 |
| WO | WO 93/23725 A1 | 9/1997 |
| WO | WO 01/96107 A2 | 12/2001 |
| WO | WO 01/96114 A1 | 12/2001 |

OTHER PUBLICATIONS

Schimtz, Peter et al., "Films." Ullmann's Encyclopedia of Industrial Chemistry, 5th Ed., vol. A11 (1988), pp. 85-95, 108-110.*

* cited by examiner

Primary Examiner—Vivian Chen
(74) Attorney, Agent, or Firm—ProPat, L.L.C.

(57) ABSTRACT

The invention relates to an at least two-layer polyester film with a total thickness of from about 5 to about 200 μm which comprises polyethylene terephthalate and from about 2 to about 20% by weight—based on the weight of the entire film—of polyethylene naphthalate, and also at least one functional outer layer.

15 Claims, No Drawings

MULTILAYER, TRANSPARENT FILM MADE FROM PET AND PEN WITH AT LEAST ONE FUNCTIONAL OUTER LAYER FOR PRODUCING COMPOSITE PACKAGING WITH UV RESISTANCE

The invention relates to a multilayer, transparent film with reduced permeability for UV radiation. The film comprises terephthalic acid units and also naphthalenedicarboxylic acid units, and also at least one functional outer layer. The invention further relates to a process for producing this film and to its use in composite packaging with extended shelf life.

BACKGROUND OF THE INVENTION

Parameters important for the suitability of a film for the packaging of perishable goods are the oxygen barrier and also, in the case of transparent packaging, the permeability of the film to UV (the ultraviolet portion of light). The second item is particularly important in the case of foods, for example those presented in supermarket counters which are subject to irradiation by lamps with relatively high UV emission. If the UV permeability of the packaging here is too high the result can be unattractive discoloration and changes in taste.

A particularly important third criterion for the suitability of a packaging film is its price, since in the end-user market even relatively small price differences can shift the purchasing decision in the direction of a more favored product, even if the packaging does not meet high quality requirements with regard to shelf life.

The polyester-based packaging films currently available in the market are almost exclusively PET (polyethyleneterephthalate)-based films, such as Hostaphan® RNK. Although these films are low-priced and generally have an acceptable oxygen barrier for many applications, this barrier is nevertheless often inadequate, in particular for transparent, unmetallized packaging. In addition, PET retains relatively high permeability to UV light.

Films made from PEN (polyethylene naphthalate) provide a substantially higher oxygen barrier and also have lower UV permeability, but are uneconomic due to the high price of PEN and are therefore little used in industry.

Although this problem can be reduced to some extent by using multilayer films which comprise one or more PEN layers on a PET base (e.g. DE-A-197 20 505 or WO 01/96114), these films have problems with delamination of the layers made from the different polyesters and are relatively difficult to produce. In addition, the regrind arising cannot subsequently be reused for a product of the same value, since PET and PEN become mixed during the regrinding process and can therefore no longer be utilized to produce the high-value layers comprising 100%, or almost 100% by weight, of PEN. The material can only replace the comparatively inexpensive PET. For these reasons, although these films are less expensive than films composed mainly of PEN they are considerably more expensive than standard PET packaging films, and are therefore used only in niche markets with particular requirements.

Films made from blends of PET and PEN have also been described (e.g. GB-A-2 344 596), but here there is no indication as to how these blends can be used to produce a film with improved UV barrier and oxygen barrier, capable of being used to produce transparent packaging with increased shelf life. Nor are there any indications of the quantitative PET/PEN ratios suitable for producing films with good oxygen barrier and UV barrier.

Another important criterion for the suitability of a film for composite packaging is the presence of functional surfaces. Industry frequently requires films which are sealable, matt, have one smooth side (preventing slip between packs), or are glossy. These surfaces can best be achieved via coextruded films which have a functional outer layer. There are many descriptions of these films. However, there is no indication here as to how they can be used to produce composite packaging which protects the contents from UV light.

Another very general method of improving the UV permeability of polyester films is to add UV stabilizers/absorbers, e.g. Tinuvin® (Ciba Specialties, Switzerland). However, the use of these compounds is likewise associated with relatively high costs and, depending on the stabilizer used, is also problematic in terms of suitability for direct contact with foods.

It was an object of the present invention to provide a film whose oxygen barrier and UV barrier are better than those of straight PET films, and which has low production costs and is suitable for packaging applications, and which, when compared with packaging comprising PET films, gives the packed goods an improved lifetime, even when UV doses are relatively high.

BRIEF DESCRIPTION OF THE INVENTION

This object is achieved by means of an at least two-layer polyester film with a total thickness of from 5 to 200 μm, preferably from 6 to 50 μm, and particularly preferably from 8 to 14 μm, which comprises polyethylene terephthalate and (based on the weight of the entire film) from 2 to 20% by weight, preferably from 4-16% by weight, and particularly preferably from 6-12% by weight, of polyethylene naphthalate, and also at least one functional outer layer. The invention also provides packaging which is produced from these polyester films. The distribution of the polyethylene naphthalate across the individual layers is of no importance here. However, it has proven advantageous for the proportion of polyethylene naphthalate in each layer not to exceed a content of 25% by weight, since otherwise it is not possible to ensure that the film has sufficient crystallizability or orientation. An exception is provided by the sealable variant described at a later stage below with a PET/PEN outer layer in which the PEN content is advantageously above 25% by weight in order to make the layer sealable.

DETAILED DESCRIPTION OF THE INVENTION

Surprisingly, the low PEN contents of the invention are sufficient to extend markedly the lifetime of foods packed using these films—when comparison is made with packaging made from conventional PET films—either when the film is produced from mixtures of PET chips and PEN chips (block copolymers) or when random copolymers are used. The improvement achievable here depends on the amount of PEN and on the thickness of the film. For example, for a film of thickness from 50 to 200 μm it is sufficient to use from 3 to 8% by weight of PEN in order to prevent discoloration of the packed meat or other contents during storage for one month under the UV intensities prevailing in conventional refrigerated counters in supermarkets. From 5 to 16% by weight of PEN are needed for similarly good results in films of from 8 to 24 μm. The films of the invention have transmittance at 330 nm of less than 25% and preferably less than 10%. At 350 nm the films of the invention have transmittance of less than 25% and preferably less than 10%.

PEN concentrations higher than the range of the invention reduce, and finally eliminate, the tendency toward crystallization. This leads in turn to a markedly lower oxygen barrier and water-vapor barrier, and to a marked impairment in processing properties. For achievement of an adequate oxygen barrier of less than 100 $\{cm^3/(m^2 \cdot d \cdot bar)\} \cdot \{$film thickness $[\mu m]/12\ [\mu m]\}$ or preferably less than 97 $\{cm^3/(m^2 \cdot d \cdot bar)\} \cdot \{$film thickness $[\mu m]/12\ [\mu m]\}$ and particularly preferably less than 95 $\{cm^3/(m^2 \cdot d \cdot bar)\} \cdot \{$film thickness $[\mu m]/12\ [\mu m]\}$ it is therefore also advantageous for there to be at least one melting peak between 230 and 270° C., and preferably between 240 and 265° C., in the DSC (digital scanning calorimeter) under the conditions described under Test methods.

For achievement of the barrier mentioned it is also advantageous for the PEN concentration of the film to be at least 5% by weight.

Alongside the proportions mentioned of PEN, the film of the invention comprises PET, i.e. polyethylene terephthalate, as main constituent. Alongside terephthalic acid (TPA) and the inventive amounts of 2,6-naphthalenedicarboxylic acid (NDA) as monomers, the film may comprise from 0 to 20% by weight (preferably from 0.5 to 2.5% by weight) of isophthalic acid, and in this context it has surprisingly been found that from 0.5 to 2.5% by weight content of isophthalic acid (IPA) gives a further improvement of from 2 to 5% in the oxygen barrier. Of course, the dimethyl esters of the dicarboxylic acids mentioned are also suitable monomers, as well as the acids themselves. The proportion of other dicarboxylic acids or dimethyl esters, e.g. 1,5-naphthalenedicarboxylic acid, should not exceed 6% by weight, preferably 2% by weight.

The main monomer of the diol component is ethylene glycol (EG). In contrast to the positive effect mentioned of IPA, the barrier reduces with rising diethylene glycol (DEG) content. The proportion of DEG should therefore not exceed 3% by weight and is ideally from 0.5 to 1.5% by weight. The proportion of other comonomer diols, e.g. cyclohexanedimethanol, 1,3-propanediol, 1,4-butanediol, should not exceed 5% by weight and is preferably less than 3% by weight. All of these data, like the PEN content, are based on the total weight of the film.

Depending on functionality, the functional outer layers considered separately comprise other contents of monomers.

In the event that the film of the invention comprises regrind (=polymer produced from production waste) from other applications (i.e. film production involving production of another film for another application), it has proven advantageous to add at least one optical brightener to the film. These optical brighteners can absorb UV radiation in the wavelength region from about 360 to 380 nm and emit this in turn in the form of longer-wavelength, visible blue-violet light. Suitable optical brighteners are bisbenzoxazoles, phenylcoumarins, and bisstyrylbiphenyls, in particular phenylcoumarin, particularly preferably triazine phenylcoumarin (Tinopal®, Ciba-Geigy, Basle, Switzerland). Besides the optical brightener, polyester-soluble blue dyes may also be added where appropriate. Blue dyes which have proven suitable are cobalt blue, ultramarine blue, and anthraquinone dyes, in particular Sudan Blue 2 (BASF, Ludwigshafen, Germany). The amounts used of the optical brighteners are from 10 to 50 000 ppm, in particular from 20 to 30 000 ppm, particularly preferably from 50 to 25 000 ppm, based on the weight of the layer to be modified. The amounts used of the blue dyes are from 10 to 10 000 ppm, in particular from 20 to 5 000 ppm, particularly preferably from 50 to 1 000 ppm, based on the weight of the layer to be modified.

The film of the invention has at least two layers. In the simplest case, the invention encompasses structures made from a base layer (B) and from a functional outer layer (A), the outer layer being that outermost outer layer of a multilayer film which is in contact with the atmosphere. Preference is also given to films with a base layer (B) and with a functional outer layer (A) on each surface of the base layer (B). Preference is also given to films with a base layer (B) and with a functional outer layer (A), and with another outer layer (C) on that side of the base layer (B) opposite to the outer layer (A). The thickness of the outer layer(s) is selected independently of the other layers and is preferably in the range from 0.1 to 10 µm, in particular from 0.2 to 5 µm, with preference from 0.3 to 2 µm, and outer layers applied on both sides here may have identical or different thickness and composition. The thickness of the base layer is therefore derived from the difference between the total thickness of the film and the thickness of the outer and intermediate layer(s) applied, and like that total thickness can thus vary within wide limits. The base layer is generally either the thickest of all of the layers present or the innermost layer. This base layer may also be an "outer layer", but only insofar there is/are no other outer layer(s) on one or both sides of this base layer.

In one preferred embodiment, the functional outer layer A is sealable.

The structure of the sealable outer layer A advantageously applied by coextrusion to the base layer B may be based on polyester copolymers, for example. Two variants are preferred here for the purposes of the invention:
  a: copolyester made from terephthalic acid and isophthalic acid
  b: copolyester made from terephthalic acid and naphthalenedicarboxylic acid Version a:

The sealable outer layer is substantially composed of copolyesters composed mainly of isophthalic acid units and of terephthalic acid units and of ethylene glycol units. The remaining monomer units derive from those other aliphatic, cycloaliphatic, or aromatic diols or, respectively, dicarboxylic acids which may also be present in the base layer. The preferred copolyesters which provide the desired sealing properties are those whose structure has ethylene terephthalate units and ethylene isophthalate units. The proportion of ethylene terephthalate is from 40 to 95 mol %, and the corresponding proportion of ethylene isophthalate is from 60 to 5 mol %. Preference is given to copolyesters in which the proportion of ethylene terephthalate is from 50 to 90 mol % and the corresponding proportion of ethylene isophthalate is from 50 to 10 mol %, and great preference is given to copolyesters in which the proportion of ethylene terephthalate is from 60 to 85 mol %, and the corresponding proportion of ethylene isophthalate is from 40 to 15mol %.

Version b:

The sealable outer layer is substantially composed of copolyesters mainly composed of naphthalenedicarboxylic acid units and of terephthalic acid units and of ethylene glycol units. The remaining monomer units derive from those other aliphatic, cycloaliphatic, or aromatic diols or, respectively, dicarboxylic acids which may also be present in the base layer. The preferred copolyesters which provide the desired sealing properties are those whose structure has ethylene terephthalate units and ethylene naphthalate units.

The proportion of ethylene terephthalate is from 30 to 75 mol %, and the corresponding proportion of ethylene naphthalate is from 70 to 25 mol %. Preference is given to copolyesters in which the proportion of ethylene terephthalate is from 40 to 60 mol %, and the corresponding proportion of ethylene isophthalate is from 40 to 60 mol %.

If the content of PEN in the sealable layer is not sufficient to achieve the inventively significant total PEN content of the film, the balancing PEN content should be added to the base layer or to any other outer layer C present. However, the other outer layer C present where appropriate and opposite to the sealable layer should advantageously comprise less than 2% by weight of PEN in order to avoid unintended sealing to side C.

Versions a and b may be combined with one another. This can reduce the minimum amounts of isophthalic acid and, respectively, PEN. However, for PET/PEN/IPA sealable layers it has proven advantageous for the PEN content of the sealable layer A to be at least 15% by weight, and for the isophthalic acid content to be at least 5% by weight.

For a particularly preferred film property profile, the sealable film has an outer layer C which comprises more particles (i.e. a higher particle concentration) than the sealable outer layer A. The particle concentration in this second outer layer C is from 0.1 to 1.0% by weight, advantageously from 0.1 to 0.8% by weight, and in particular from 0.15 to 0.6% by weight. In contrast, the other, sealable outer layer A opposite to the outer layer C has a lower level of filling with particles. The concentration of the particles in the layer A is from 0.01 to 0.2% by weight, preferably from 0.015 to 0.15% by weight, and in particular from 0.02 to 0.1% by weight.

Examples of the particles used are inorganic particles, such as kaolin, talc, $SiO_2$, $MgCO_3$, $CaCO_3$, $BaCO_3$, $CaSO_4$, $BaSO_4$, $Li_3PO_4$, $Ca_3(PO_4)_2$, $Mg_3(PO_4)_2$, $TiO_2$, $Al_2O_3$, MgO, SiC, LiF, or the Ca, Ba, or Mn salts of the aromatic dicarboxylic acids used for the polyesters of the layer. However, it is also possible to add particles based on crosslinked, non-melting, organic polymers, e.g. polystyrenes, polyacrylates, polymethacrylates.

In another preferred embodiment, the functional outer layer A is matt. The mattness of the outer layer A may in principle be achieved in a number of different ways. In one preferred embodiment, the outer layer comprises, based on its weight, from 0.5 to 10% by weight (preferably from 2 to 8% by weight and particularly preferably from 3 to 6% by weight) of a particle with a $d_{50}$ value of from 1 to 10 μm, preferably from 2 to 8 μm, and particularly preferably from 3 to 6 μm. Suitable particles are the particles described above for the sealable outer layers. Besides these coarse particles, other particles which may be added are of the same type but with a $d_{50}$ value <1 μm. It has proven advantageous for the matt outer layer to comprise other monomers besides PET and, where appropriate, PEN. Isophthalic acid contents of from 1 to 10% by weight and, respectively, diethylene glycol contents of from 1 to 5% by weight, or butanediol contents of from 1 to 6% by weight or propanediol contents of from 1 to 6% by weight, or a combination of one or more of these monomers, are particularly advantageous here. In another preferred embodiment, the matt outer layer comprises a blend or a mixture of two components (I) and (II) and, where appropriate, additives in the form of particles as described above for the sealable outer layers.

Component (I) of the mixture or of the blend is an ethylene terephthalate homopolymer or ethylene terephthalate copolymer, or a mixture of ethylene terephthalate homopolymers or ethylene terephthalate copolymers.

Component (II) of the mixture or of the blend is an ethylene terephthalate copolymer which is composed of the condensation product of the following monomers or their derivatives capable of forming polyesters:

| | |
|---|---|
| from 65 to 95 mol % | of isophthalic acid; |
| from 0 to 30 mol % | of at least one aliphatic dicarboxylic acid having the formula $HOOC(CH_2)_nCOOH$, where n is in the range from 1 to 11; |
| from 5 to 15 mol % | of at least one sulfo monomer containing an alkali metal sulfonate group on the aromatic moiety of a dicarboxylic acid; | a copolymerizable aliphatic or cycloaliphatic glycol having from 2 to 11 carbon atoms, its stoichiometric amount being that needed to form 100 mol % of condensate; each of the percentages here being based on the total amount of the monomers forming component (II). For a detailed description of the component (II), reference is made to the disclosure of EP-A-0 144 878, which is expressly incorporated herein by way of reference.

Mixtures in the above sense are mechanical mixtures which are prepared from the individual components. For this purpose, the individual components in the form of small-dimension compressed moldings, e.g. lenticular or bead-shaped pellets, are combined and mixed with one another mechanically using a suitable agitator. Another way of producing the mixture feeds each of the individual components (I) and (II) in pellet form separately to the extruder for the outer layer, with mixing in the extruder or in the downstream systems which conduct the melt.

A blend in the above sense is an alloy-like composite of the individual components (I) and (II) which cannot then be broken down again into its original constituents. A blend has properties similar to those of a homogeneous substance and can therefore be characterized via appropriate parameters.

The ratio (ratio by weight) of the two components (I) and (II) in the mixture for the outer layer or in the blend can vary within wide limits and depends on the intended application for the multilayer film. The ratio of components (I) and (II) is preferably in the range from (I):(II)=10:90 to (I):(II)=95:5, preferably from (I):(II)=20:80 to (I):(II)=95:5, and in particular from (I):(II)=30:70 to (I):(II)=95:5.

In one preferred embodiment, the matt outer layer A is characterized by the following parameter set:

The roughness of the matt outer layer A, expressed as $R_a$ value, is in the range from 200 to 1 000 nm, preferably from 220 to 950 nm, and particularly preferably from 250 to 900 nm. Values smaller than 200 nm have adverse effects on the degree of mattness of the surface, while values greater than 1 000 nm impair the optical properties of the film.

The value measured for surface gas flow time (see Test methods) should be in the range from 0 to 50 s, preferably from 1 to 45 s. The degree of mattness of the film is adversely affected at values above 50 s.

In another preferred embodiment, the functional outer layer A is glossy and has a low $R_a$ value.

In the embodiment with high gloss, the functional outer layer A has a high gloss >180, preferably >190, and particularly preferably >200, at a measurement angle of 20° (measured to DIN 67 530 (see Test methods)). The functional outer layer A moreover has a $R_a$ value (see Test methods) of <100 nm, preferably <60 nm, and particularly preferably <40 nm. The method of achieving these gloss values and roughness values is that the outer layer A comprises a particularly low proportion of particles with a $d_{50} > 0.5$ μm. This is preferably below 3 000 ppm. The proportion of particles with a $d_{50} > 2$ μm in the outer layer A here is smaller than 1 000 ppm, preferably <500 ppm, and particularly preferably <250 ppm. To achieve a particularly preferred property profile for the film, the gloss film has, besides the outer layer A, an outer layer C which comprises more particles (i.e. a higher particles concentration) than the glossy outer layer A. The particle concentration in this second outer layer C is from 0.1 to 1.0% by weight, advantageously from 0.12 to 0.8% by weight, and in particular from 0.15 to 0.6% by weight. The proportion of particles with a $d_{50} > 2$ μm in the outer layer C here is greater than 250 ppm, preferably >500 ppm, and particularly preferably >750 ppm. Particles which may be used are again the particles mentioned above for the sealable outer layers.

In another preferred embodiment, the functional outer layer A has particles which give this layer a $R_a$ value greater than 40 nm, these particles therefore being termed "antiblocking". The surface gas flow time for the film on the side of the outer layer A is smaller than 500 s, preferably <400 s, and particularly preferably <300 s. The manner of achieving this is that the outer layer A comprises particles at a concentration from 0.05 to 1.0% by weight. The content of particles with a $d_{50} > 1$ μm here is at least 0.005% by weight, preferably from 0.05 to 0.15% by weight. The particles used are again the particles mentioned above for the sealable outer layers.

In one particularly preferred embodiment of the antiblocking film, the ash content (for determination, see Test methods) of the film is <0.2% by weight, preferably <0.18% by weight, particularly preferably <0.15% by weight, since otherwise the haze is inappropriately high.

The film of the invention may also have a coating on at least one side, for example a copolyester or an adhesion promoter.

In another embodiment for applications with particularly high barrier requirements, the film is provided with a vapor-deposited metal (semimetal) oxide layer, examples being $Al_2O_x$ or $SiO_x$.

Where appropriate, the polyester for the base layer also comprises particles as given above for the sealable outer layers. The particles are preferably used at a concentration of from 0.005 to 10.0% by weight, particularly preferably at a concentration of from 0.01 to 0.5% by weight. The average particle size is from 0.001 to 10 μm, preferably from 0.005 to 3 μm.

The polyesters used for the films of the invention may be prepared by the transesterification process using the conventional catalysts, e.g. salts of Zn, of Ca, of Li, or of Mn, or by the direct esterification process.

The standard viscosity SV (DCA) of the polyester used, measured in dichloroacetic acid to DIN 53728, is from 400 to 1 200, preferably from 700 to 900.

In one preferred embodiment, the PEN content or some of the PEN content is introduced to the film by feeding regrind from another PEN application. This may, for example, be regrind from PEN capacitor film production (generally 10% by weight of PEN), or particularly preferably regrind from an application which, as mentioned at the outset, uses one or more PEN layers on a PET base. When this type of regrind is used the material has been found to give particularly reliable running, since the prior mixing of PET and PEN here gives better stretching capability. If straight PEN regrind is used, it has proven advantageous for this not to be solid-phase-condensed—as is otherwise usual prior to reuse. Besides this foreign regrind, the film also comprises up to 65% by weight of self-regrind or regrind from other PET film applications, and it has proven advantageous here for stability of the process for the film to comprise at least 20% by weight of self-regrind (since this in itself provides good mixing of PET/PEN).

The invention also provides a process for producing the polyester film of the invention by the extrusion or coextrusion process known per se.

The procedure for this process is that the melts corresponding to the individual layers of the film are coextruded through a flat-film die, the resultant film is drawn off on one or more rolls for solidification, and the film is then biaxially stretched (oriented), and the biaxially stretched film is heat-set and, where appropriate, corona- or flame-treated on the surface intended for treatment.

The biaxial stretching is generally carried out sequentially. It is preferable here to begin with longitudinal stretching (i.e. in machine direction=MD) and follow this by transverse stretching (i.e. perpendicularly to machine direction=TD). This leads to orientation of the molecular chains of the polyester. The longitudinal stretching preferably takes place with the aid of two rolls rotating at different speeds corresponding to the desired stretching ratio. For the transverse stretching, a general method is to utilize an appropriate tenter frame.

The temperature at which the stretching is carried out may vary over a relatively wide range, and depends on the desired properties of the film. The longitudinal stretching is generally carried out at from 80 to 130° C., preferably at from 90 to 120° C., particularly preferably at from 100 to 110° C., and the transverse stretching at from 90 to 150° C., preferably at from 90 to 120° C., particularly preferably at from 100 to 110° C. The longitudinal stretching ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1.

The stretching may also take place in a simultaneous stretching frame (simultaneous stretching), the number of stretching steps and the sequence (longitudinal/transverse) here not being of decisive importance for the property profile of the film. The stretching ratios are those found in the conventional sequential process.

In the heat-setting which follows, the film is held for from 0.1 to 10 s, at a temperature of from 150 to 250° C., preferably from 190 to 240° C., particularly preferably from 210 to 230° C. The film is then cooled and then wound up in the usual way. However, prior to winding up, the film may also be chemically treated or else corona- or flame-treated to establish other desired properties. The intensity of treatment is set in such a way as to give the treated film a surface tension greater than or equal to 45 mN/m.

The film may also be coated to establish other properties. Typical coatings are those with adhesion-promoting, antistatic, slip-improving, or release action. Clearly, these additional layers may be applied to the film via in-line coating, using aqueous dispersions, after longitudinal stretching and prior to transverse stretching.

The film composite finally used for packaging purposes comprises, besides the film of the invention (=film I), depending on the use, other films (=film II), for example films made from PET or made from an oriented polyamide (oPA), or polyethylene (PE) sealable films or polypropylene (PP) sealable films. The film or the composite may also have been coated with a sealable layer, for example of PP or PE, to control sealing properties. Preferred methods for combining the individual films to give a film composite use laminating adhesives, e.g. those based on polyurethane.

The packaging finally used is therefore composed either of the composite sealed to itself (bag packaging) or of the composite applied as "lid" to a substrate (tray). In the case of the second possibility, it is to be noted that the tray, if it is transparent, should also have low UV permeability, achievable by using the film of the invention applied by lamination, for example. Transparent laminates or composites are described by way of example in DE-A-33 00 411 and DE-A-26 44 209.

The total thickness of the inventive composite film, which is composed at least of the inventive film I and of a film II, may vary within wide limits and depends on the application. The inventive composite films preferably have a thickness in the range from 9 to 1 200 µm, in particular from 10 to 1 000 µm, particularly preferably from 20 to 800 µm.

The film II of the inventive composite film may be a thermoplastic film and/or a standard thermoplastic film, and/or a polyolefin film, and/or the inventive film I. This second film is preferably applied to that side of the film I which has additional functionality ($SiO_x$ coating, corona treatment, and/or flame treatment, and/or adhesion promoter, and/or copolyester, and/or $Al_2O_x$ coating, and/or printing inks, to mention just a few functionalities), but may also be applied to that side of the film which has no functionality.

The film II may have one or more layers and, like film I, may have been oriented by stretching, and may have at least one sealable layer. The second film may have been bonded to film I of the invention with or without adhesive.

The thickness of this film II is generally from 4 to 700 µm.

The composite films are generally obtained by laminating at least the films I and II employed to one another with or without an adhesive layer therebetween, by passing these between rolls temperature-controlled to from 30 to 90° C.

However, it is also possible, for example, to apply the film II to the previously produced film I by in-line coating (melt extrusion).

When adhesives are used, these are applied to one surface of the film I and/or of the film II, using known methods, in particular by application from solutions or dispersions in water or in organic solvents. These solutions usually have an adhesive concentration of from 5.0 to 40.0% by weight, in order to give an amount of from 1.0 to 10.0 g/m² on the film I and/or II.

Adhesives which have proven particularly advantageous are those composed of thermoplastic resins, such as cellulose esters and cellulose ethers, of alkyl esters and acrylic esters, of polyimides, of polyurethanes, or of polyesters, or of hot-curing resins, such as epoxy resins, urea-formaldehyde resins, phenol-formaldehyde resins, or melamin/formaldehyde resins, or of synthetic rubbers.

Examples of suitable solvents for the adhesive are hydrocarbons, such as ligroin and toluene, esters, such as ethyl acetate, or ketones, such as acetone and methyl ethyl ketone.

It was particularly surprising that despite the low PEN contents of the invention, even composites with thin PET/PEN copolymer films (e.g. 12 µm) protect the contents so effectively from spoiling under UV light that shelf life extensions of more than 100% are possible even without the use of additional UV absorbers.

The invention is further illustrated below using examples.

The following standards or methods were used here for measuring each of the properties:

Test Methods

Ash Content

The ast content of a film or of a PET reflects the pigment content and also the content of any mineral contaminants which may be present. The method for ash determination for PET pellets and PET films is based on the test standards DIN 53568 (1974 and 1978) and DIN 3451 (1991).

About 10 g of PET chips or comminuted film are weighed out on an analytical balance (Sartorius (200 g)) with accuracy ±0.5 mg into a porcelain crucible (tall form, 102/60) previously heated to constant weight at red heat and stored over phosphorus pentoxide. The crucible is placed in a rapid-ashing device (Gestigkeit SVD 95) and the specimen is pre-ashed. The settings and times here are as follows:

Time: from 30 to 40 min at 600° C. and then
from 30 to 40 min at 700° C.

The crucibles are then heated to red heat for 3 h or to constant weight in a muffle furnace (Heraeus K 1252) at 600° C.

The crucibles are transferred for cooling into a desiccator charged with phosphorus pentoxide (Sicapent), cooled to room temperature, and then precision-weighed.

Each determination is repeated, and in the case of major discrepancies a third measurement is carried out.

Ash Content Determination:

Ash (%)=(final weight×100)/initial weight

Surface Gas Flow Time

The principle of the test method is based on the air flow between one side of the film and a smooth silicon wafter sheet. The air flows from the surroundings into an evacuated space, and the interface between film and silicon wafer sheet acts as a flow resistance.

A round specimen of film is placed on a silicon wafer sheet, in the middle of which there is a hole providing the connection to the receiver. The receiver is evacuated to a pressure below 0.1 mbar. The time in seconds taken by the air to establish a pressure rise of 56 mbar in the receiver is determined.

Test Conditions:

| | |
|---|---|
| Test area | 45.1 cm² |
| Weight applied | 1276 g |
| Air temperature | 23° C. |
| Humidity | 50% relative humidity |
| Aggregated gas volume | 1.2 cm³ |
| Pressure difference | 56 mbar |

Light Transmittance

Light transmittance is the ratio of total transmitted light to the quantity of incident light.

It is measured using "Hazegard plus" equipment to ASTM D1003.

SV (DCA), IV (DCA)

Standard viscosity SV (DCA) is determined at 25° C. in dichloroacetic acid by a method based on DIN 53726. Intrinsic viscosity (IV) is calculated as follows from standard viscosity:

$$IV(DCA)=[\eta]=6.907 \cdot 10^{-4} SV(DCA)+0.063096 \, [dl/g]$$

Yellowness Index

Yellowness Index YI is the deviation from the colorless condition in the "yellow" direction and is measured to DIN 6167. Yellowness Index YI values of <5 are not visible.

Gloss

Gloss was determined to DIN 67 530 with a measurement angle of 20°. Reflectance was measured as an optical value characteristic of a film surface. A beam of light hits the flat test surface at the set angle of incidence and is reflected and/or scattered by this surface. A proportional electrical variable is displayed representing light rays hitting the photoelectronic detector. The value measured is dimensionless and must be stated together with the angle of incidence.

Roughness

Roughness $R_a$ of the film was determined to DIN 4768 with a cut-off of 0.25 mm.

Melting Peak

The glass transition temperature $T_g$ was determined using film specimens with the aid of DSC (differential scanning calorimetry)(DIN 73 765). A DuPont DSC 1090 was used. The heating rate was 20 K/min, and the weight of specimen used was about 12 mg. The melting peak was determined in the first heating procedure. The maximum of the largest endothermic peak at from 180 to 270° C. was evaluated here as the melting peak.

Oxygen Barrier

The oxygen barrier was measured using a Mocon Modern Controls (USA) OX-TRAN 2/20 as in DIN 53 380, Part 3.

Shelf Life 200 g of boiled ham, in slices of diameter 10 cm and thickness 2.5 mm, were placed in the composite packaging using the inventive film, and the packaging was then sealed. A second composite packaging of the same type but using a commercially available PET film of the same thickness (in this case RNK from Mitsubishi Polyester Film Europe GmbH) is filled in the same way. Three packs of the UV-protected inventive composite and three packs using the commercially available PET film are then placed in an open chest refrigerator whose temperature is +3° C. 1 m above the packs (side with inventive film upward) there are 5 commercially available Philips TL20W/05 neon tubes. The packs are (visually) checked daily for visible discoloration. The time to appearance of discoloration is noted, and the average (in hours) for the packs made from commercially available PET film is set at 100%. The percentage difference from this value is calculated for the inventive packs, the method being to divide the average (in hours) for occurrence of discoloration on these packs by the average of the packs made from commercially available PET film, the result being multiplied by 100. 100 is subtracted from the result.

Each of the examples and comparative examples below uses a single-layer transparent film of varying thickness.

Film Production

Thermoplastic chips for the base layer B were mixed in the ratios given in the examples and precrystallized in a fluidized-bed dryer at 155° C. for 1 min, then dried at 150° C. in a tower dryer for 3 h, and melted at 290° C. in a single-screw extruder. The thermoplastic chips for the outer layers A and, respectively, C were mixed in the ratios given in the examples and extruded at 290° C. in a twin-screw extruder. The molten polymer extrudates were combined in a coextrusion die and drawn off via a take-off roll. The film was stretched by a factor of 4.0 in the machine direction at 116° C. and by a factor of 3.9 transversely in a frame at 110° C. The film was then heat-set at 225° C. and relaxed transversely by 2% at temperatures of from 200 to 180° C.

Composite Production

From each of the films of the examples, three different composites were manufactured. For measurement of shelf life, the composite is sealed to a commercially available APET tray as substrate (on the side facing away from the UV light).

Composite A

Composite Film using PE

The film from the example is coated with an adhesive (Adcote® 700 A+C from Rohm & Haas, Germany) in such a way that the weight of the adhesive layer formed is 0.5 g/m². A film of thickness 40 µm made from low-density polyethylene (Buklin® 40 µm from B&K, Germany) is then laminated onto the film of the example coated with adhesive (anchoring agent).

Composite B

Composite Film using PP

The film from the example is coated with an adhesive (Adcote® 700 A+C from Rohm & Haas, Germany) in such a way that the weight of the adhesive layer formed is 0.5 g/m². A sealable film of thickness 30 µm made from polypropylene (GND 30 from Trespaphan, Germany) is then laminated onto the film of the example coated with adhesive (anchoring agent).

Composite C

Composite Film using PET

The film from the example is coated with an adhesive (Adcote® 700 A+C from Rohm & Haas, Germany) in such a way that the weight of the adhesive layer formed is 0.5 g/m². A biaxially oriented sealable film of thickness 20 µm made from PET (Hostaphan® RHS from Mitsubishi Polyester Film GmbH, Wiesbaden, Germany) is then laminated onto the film of the example coated with adhesive (anchoring agent). When the sealable inventive film is used this replaces the RHS as sealable film. In this case RNK 12 (Mitsubishi Polyester Film GmbH, Wiesbaden, Germany) serves as PET film.

EXAMPLES

Commercially available packaging films from Mitsubishi Polyester Film GmbH (Wiesbaden, Germany) were used as comparative for shelf life improvement.

Example 1

A transparent, single-side-sealable film of thickness 23 µm was produced. The base layer has a thickness of 19 µm, and each of the outer layers A and C has a thickness of 2 µm.

| Mixture for base layer B: | | |
|---|---|---|
| R1: | RT49 PET (KoSa, Offenbach, Germany), SV = 800 | 50% by weight |
| R2: | PET/PEN film regrind with 10% by weight of PEN, SV = 700, IPA content = 4% by weight | 50% by weight |
| Mixture for sealable outer layer A: | | |
| R3: | PET, SV = 800, comprising 5000 ppm of Sylysia 320 (Fuji Japan; $d_{50}$ = 2.4 µm) and 7000 ppm of Aerosil TT600 (Degussa/Germany) | 1% by weight |
| R4: | PET, SV = 800, with 70 mol % of ethylene terephthalate and 30 mol % of ethylene isophthalate | 69% by weight |
| R5: | 100% by weight of PEN, SV = 650 | 10% by weight |
| R2: | see above | 20% by weight |

| Mixture for outer layer C: | | |
|---|---|---|
| R1: | see above | 85% by weight |
| R3: | see above | 15% by weight |

Oxygen barrier=49{cm$^3$/($m^2 \cdot d \cdot$bar)}·{23μm/12μm}

Shelf life rise in % compared with a similar composite using RHS 23 film (Mitsubishi Polyester Film GmbH, Wiesbaden, Germany):

| | |
|---|---|
| Composite A: | 53% |
| Composite B: | 60% |
| Composite C: | 30% |

Example 2

A transparent, single-side-matt film of thickness 12 μm was produced. The base layer has a thickness of 9 μm, and each of the outer layers A and C has a thickness of 1.5 μm.

| Mixture for base layer B: | | |
|---|---|---|
| R1: | RT49 PET (KoSa, Offenbach, Germany), SV = 800 | 42% by weight |
| R6: | PET/PEN film regrind with 10% by weight PEN content, SV = 700, ash = 0.1% by weight | 50% by weight |
| R5: | see above | 8% by weight |
| Mixture for matt outer layer A: | | |
| R3: | see above | 2% by weight |
| R7: | PET, SV = 800, with 95 mol % of ethylene terephthalate and 5 mol % of ethylene isophthalate and 50 000 ppm of Sylobloc CP4 - 8191 (Grace Germany), $d_{50}$ = 7 μm | 98% by weight |
| Mixture for outer layer C: | | |
| R1: | see above | 95% by weight |
| R3: | see above | 5% by weight |

Oxygen barrier=93{cm$^3$/($m^2 \cdot d \cdot$bar)}·{12μm/12μm}

Shelf life rise in % compared with a similar composite using MP 12 film (Mitsubishi Polyester Film GmbH, Wiesbaden, Germany):

| | |
|---|---|
| Composite A: | 95% |
| Composite B: | 95% |
| Composite C: | 55% |
| Roughness side A: | $R_a$ = 400 nm |
| Roughness side C: | $R_a$ = 60 nm |
| Gas flow time side A: | 35 s |

Example 3

A transparent film of thickness 12 μm was produced with high gloss on one side. The base layer has a thickness of 9 μm, and each of the outer layers A and C has a thickness of 1.5 μm.

| Mixture for base layer B: | | |
|---|---|---|
| R1: | RT49 PET, SV = 800 | 41% by weight |
| R6: | PET/PEN film regrind with 10% by weight PEN content, SV = 700, ash 0.1% by weight | 50% by weight |
| R5: | see above | 9% by weight |
| Mixture for glossy outer layer A: | | |
| R3: | see above | 0.4% by weight |
| R1: | see above | 99.6% by weight |
| Mixture for outer layer C: | | |
| R1: | see above | 93% by weight |
| R3: | see above | 7% by weight |

Oxygen barrier=92{cm$^3$/($m^2 \cdot d \cdot$bar)}·{12μm/12μm}

Shelf life rise in % compared with a similar composite using MP 12 film (Mitsubishi Polyester Film GmbH, Wiesbaden, Germany):

| | |
|---|---|
| Composite A: | 95% |
| Composite B: | 95% |
| Composite C: | 55% |
| Gloss side A: | 210 |
| Roughness side A: | $R_a$ = 37 nm |
| Roughness side C: | $R_a$ = 65 nm |

Example 4

A transparent film of thickness 12 μm was produced with antislip properties on both sides.

The base layer has a thickness of 9 μm, and each of the outer layers A and C has a thickness of 1.5 μm.

| Mixture for base layer B: | | |
|---|---|---|
| R1: | RT49 PET, SV = 800 | 41% by weight |
| R6: | PET/PEN film regrind with 10% by weight PEN content, SV = 700, ash 0.1% by weight | 50% by weight |
| R5: | see above | 9% by weight |
| Mixture for outer layer A: | | |
| R3: | see above | 7% by weight |
| R1: | see above | 93% by weight |
| Mixture for outer layer C: | | |
| R1: | see above | 93% by weight |
| R3: | see above | 7% by weight |

Oxygen barrier=93{cm$^3$/($m^2 \cdot d \cdot$bar)}·{12μm/12μm}

Shelf life rise in % compared with a similar composite using MP 12 film (Mitsubishi Polyester Film GmbH, Wiesbaden, Germany):

| | |
|---|---|
| Composite A: | 85% |
| Composite B: | 75% |
| Composite C: | 50% |
| Gloss side A: | 210 |
| Roughness sides A and C: | $R_a$ = 67 ± 5 nm |
| Gas flow time sides A and C: | 210 ± 70 s |

The invention claimed is:
1. A biaxially oriented, coextruded polyester film with a total thickness of from about 5 to about 200 μm which comprises a base layer disposed between two outer layers, said film comprising polyethylene terephthalate and from 8% to about 20% by weight—based on the weight of the entire film—of polyethylene naphthalate, wherein said film includes at least one functional outer layer, said films having a transmittance at 330 nm of less than 25%, said polyethylene naphthalate present within said base layer alone, said film having a melting peak between about 230 and about 270° C. and said coextruded layers providing an oxygen barrier of less than 100 $\{cm^3/(m^2 \ d \ bar)\} \cdot \{$film thickness $[\mu m]/12 \ [\mu m]\}$.

2. The film as claimed in claim 1, which has a melting peak between about 240 and about 265° C., said film comprising diethylene glycol in an amount of to 3 percent by weight and providing an oxygen baffler of less than 97 $\{cm^3/(m^2 \ d \ bar)\} \cdot \{$film thickness $[\mu m]/12 \ [4 \ \mu m]\}$.

3. The film as claimed in claim 1, which comprises from about 0.5 to about 2.5% by weight of isophthalic acid (IPA) (based on the weight of the entire film).

4. The film as claimed in claim 1, which is composed of a polyethylene-naphthalate-containing base layer (B) and of two functional outer layers (A) and (A) or (A) and (A').

5. The film as claimed in claim 1, which is composed of a polyethylene-naphthalate-containing base layer (B) and of a functional outer layer (A) and of another outer layer (C) on tat side of the base layer opposite to (A).

6. The film as claimed in claim 1, wherein at least one functional outer layer has an additional functionality selected from: sealable, matt, gloss, and antiblock.

7. A process for producing a film as claimed in claim 1, wherein the melts corresponding to the individual layers of the film are coextruded through a flat-film die, the resultant prefilm is drawn off on one or more rolls for solidification, the prefilm is then biaxially stretched (oriented), and the biaxially stretched film is heat-set.

8. A packaging composite made from a film as claimed in claim 1 and from another film.

9. The packaging composite as claimed in claim 8, wherein the other film is polyester film, polyamide film, polyethylene film, or polypropylene film.

10. An at least two-layer polyester film according to claim 1, wherein said film is heat set at a temperature ranging from 210 up to 230° C.

11. An at least two-layered, biaxially oriented, coextruded polyester film comprising a first base layer and a second functional layer, said first base layer comprising from 3 to 8% by weight of polyethylene naphthalate, based on the weight of the layer, said film having a thickness ranging from 50 to 200 microns and exhibiting a transmittance at 330 nm of less than 25% said coextruded layers providing an oxygen barrier of less than 100 $\{cm^3/(m^2 \ d \ bar)\} \cdot \{$film thickness $[\mu m]/12 \ [\mu m])\}$.

12. An at least two-layered biaxially oriented, coextruded polyester film comprising a first base layer and a second functional layer, said first base layer comprising from 8 to 16% by weight of polyethylene naphthalate, based on the weight of the layer, said film having a thickness ranging from 8 to 24 microns and exhibiting a transmittance at 330 nm of less than 25% said coextruded layers providing an oxygen barrier of less than 100 $\{cm^3/(m^2 \ d \ bar)\} \cdot \{$film thickness $[\mu m]/12 \ [\mu m]\}$.

13. An at least two-layer polyester film comprising a biaxially oriented, co-extruded (i) base layer and (ii) at least a first functional outer layer, said film comprising polyethylene terephthalate and from 8% to about 20% by weight, based on the weight of the film, of polyethylene naphthalate, said film having a transmittance at 330 nm of less than 25%, said polyethylene naphthalate present within said base layer alone, and said coextruded layers providing an oxygen barrier of less than 100 $\{cm^3/(m^2 \ d \ bar)\} \cdot \{$film thickness $[\mu m]/12 \ [\mu m]\}$, wherein said functional outer layer is selected from a sealable, matt, gloss or antiblock layer.

14. A film according to claim 13, wherein said film further comprises a second outer layer, both of which include particles, wherein said first outer layer includes particles in an amount of from 0.01 to 0.2% by weight and said second outer layer includes particles in an amount of from 0,1 to 1.0% by weight, said second outer layer including more particles than said first outer layer.

15. The film as claimed in claim 13, said film further comprising from about 0.5 to about 2.5% by weight of isophthalic acid, said coextruded layers providing a 2 to 5% improvement in oxygen barrier in comparison to a comparable film formed without said isophthalic acid.

* * * * *

UNITED STATES PATENT AND TRADEMARK OFFICE
CERTIFICATE OF CORRECTION

| | | |
|---|---|---|
| PATENT NO. | : 7,229,696 B2 | Page 1 of 1 |
| APPLICATION NO. | : 10/462511 | |
| DATED | : June 12, 2007 | |
| INVENTOR(S) | : Kliesch et al. | |

It is certified that error appears in the above-identified patent and that said Letters Patent is hereby corrected as shown below:

Column 15
Claim 2, Line 19, delete "[4 μm]}." insert --[μm]}. --
Claim 5, Line 29, delete "tat" insert --that--

Column 16
Claim 14, Line 39, delete "0,1" insert -- 0.1 --

Signed and Sealed this

Seventh Day of August, 2007

JON W. DUDAS
*Director of the United States Patent and Trademark Office*